United States Patent
Yamamura et al.

(10) Patent No.: US 7,055,893 B2
(45) Date of Patent: Jun. 6, 2006

(54) FLOOR STRUCTURE OF VEHICLE

(75) Inventors: Daisuke Yamamura, Okazaki (JP); Takashi Yamafuji, Kariya (JP)

(73) Assignee: Mitsubishi Jidosha Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/777,760

(22) Filed: Feb. 13, 2004

(65) Prior Publication Data

US 2004/0227379 A1    Nov. 18, 2004

(30) Foreign Application Priority Data

Feb. 13, 2003    (JP)    ............................. 2003-034551

(51) Int. Cl.
 *B60R 21/02*    (2006.01)
 *B60N 3/06*    (2006.01)
(52) U.S. Cl. .............................. 296/187.08; 296/97.23; 296/75
(58) Field of Classification Search ........... 296/193.07, 296/187.08, 187.09, 187.1, 75, 97.23
See application file for complete search history.

(56) References Cited

U.S. PATENT DOCUMENTS

| 2,709,105 A | * | 5/1955 | Kramer | .................... 296/97.23 |
| 3,104,754 A | * | 9/1963 | Thurkow | .................. 198/418.8 |
| 4,280,729 A | * | 7/1981 | Morawski | ................. 296/97.23 |

FOREIGN PATENT DOCUMENTS

JP    2000-326870 A    11/2000

* cited by examiner

*Primary Examiner*—Dennis H. Pedder
(74) *Attorney, Agent, or Firm*—Birch, Stewart, Kolasch & Birch, LLP

(57) ABSTRACT

There is provided a floor structure of a vehicle, which can ensure the safety for a passenger in the event of frontal crash. A toe board is connected to the front end of a floor panel in a manner being raised upward. A cross member is fixed to the rear part of the floor panel. A carpet pad is extended rearward on the floor panel from a position in the vicinity of the toe board, and has a rear end thereof abutted on the cross member to restrict rearward movement of the carpet pad. The carpet pad is provided with a fragile part which is located in front of the cross member and is buckled by impact load is provided in the vicinity of a seat.

10 Claims, 5 Drawing Sheets

FLOOR STRUCTURE OF VEHICLE

This Nonprovisional application claims priority under 35 U.S.C. § 119(a) on Patent Application No. 2003-034551 filed in Japan on Feb. 13, 2003, the entire contents of which are hereby incorporated by reference.

BACKGROUND OF THE INVENTION

1. Field of the Invention

The present invention relates to the floor structure of a vehicle in which a toe board is raised upward from the front end of a floor panel in a vehicle body, and a pad member is extended rearward on the floor panel from a position in the vicinity of the lower end of the toe board.

2. Description of the Related Art

In the conventional floor structure of a vehicle, as shown in FIG. 4, a floor panel, 101 is provided in a substantially horizontal position at the bottom of a vehicle body, and the lower end of a toe board 102 is connected to the front end of the floor panel 101 in a manner being raised upward, as shown in FIG. 4. On the other hand, a cross member 103 is fixed to the rear of the floor panel 101. A dash pad 104 is fixed to the upper surface of the toe board 102, i.e. the vehicle compartment side of the toe board 102. A carpet pad 105 for improving the easiness to step for a passenger is extended rearward from a position in the vicinity of the lower end of the toe board 102 to the cross member 103. An ECU (Electronic Control Unit) 108 is fixed to the vehicle compartment side of the dash pad 104 via a mounting bracket 107, and a stepping bracket 109 is provided on the rear surface side of the mounting bracket 107. A carpet surface 106 is laid to cover the stepping bracket 109, carpet pad 105, and cross member 103.

In the above described conventional floor structure of the vehicle, in the event of frontal crash, the toe board 102 is bent rearward about the lower end thereof as a fulcrum, and therefore, load directed toward the rear of the vehicle is input to the passenger's legs via the stepping bracket 109. Particularly in the event of frontal crash, the passenger tends to step firmly upon the toe board 102 with toes, and hence as described above, even if the toe board 102 is deformed in a direction toward the rear of the vehicle, the heels slide on the carpet surface 106 toward the rear of the vehicle while the ankles are kept at a predetermined angle.

It should be noted that another technique has been disclosed which can surely cause the above described movement of ankles in the event of vehicle crash.

Japanese Laid-Open Patent Publication (Kokai) No. 2000-326870.

In the above described conventional floor structure of the vehicle, as shown in FIG. 5, the carpet pad 105 is likely to be bent at a position in the vicinity of the passenger's legs, and on this occasion, the passenger's legs and the bent carpet pad 105 may interfere with each other to inhibit the passenger's heels from sliding toward the rear of the vehicle. As a result, the passenger's ankles may be locked, and moment may be applied to the ankles.

SUMMARY OF THE INVENTION

The present invention provides a floor structure of a vehicle, which can ensure safety for a passenger in the event of frontal crash.

To attain the foregoing, there is provided a floor structure of a vehicle which comprises: a toe board raised from a front end of a floor panel in the vehicle; a pad member extended on the floor panel from a position in a vicinity of a lower end of the toe board toward a rear of the vehicle; a restricting member provided behind the pad member, for restricting movement of the pad member toward the rear of the vehicle; a seat disposed in the vicinity of the restricting member; and a fragile part provided in the pad member and in front of the restricting member in the vehicle, the fragile part being located in the vicinity of the seat.

The nature of this invention, as well as other features and advantages thereof, will be explained in the following with reference to the accompanying drawings, in which like reference characters designate the same or similar parts throughout the figures and wherein.

DETAILED DESCRIPTION OF THE PREFERRED EMBODIMENTS

The present invention will now be described in detail with reference to the accompanying drawings showing preferred embodiments thereof.

Figure 1:
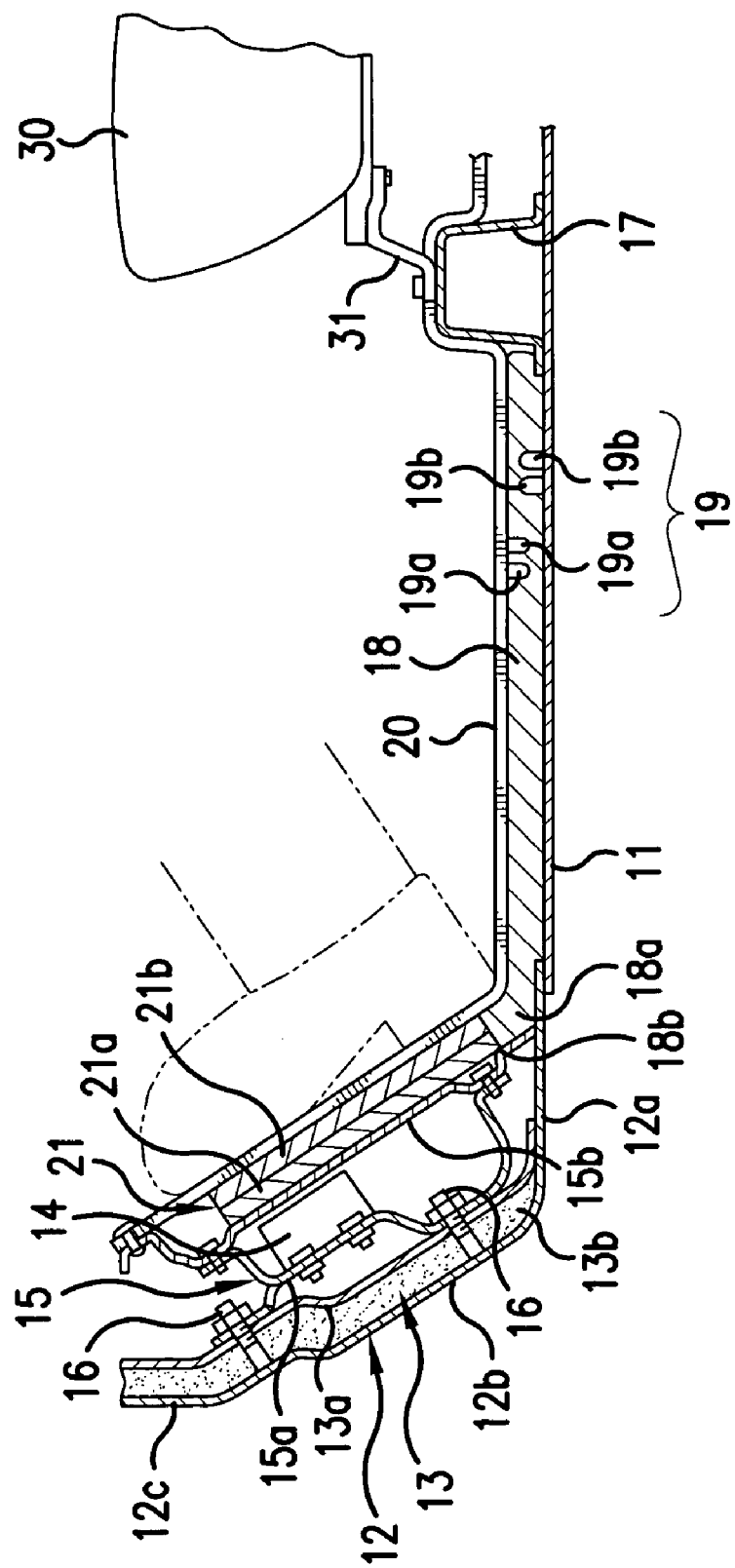
FIG. 1 is a sectional view showing essential parts of a vehicle body, which shows the floor structure of a vehicle according to a first embodiment of the present invention.

In the floor structure of the vehicle according to the present embodiment, as shown in FIG. 1, a floor panel 11 is provided in a substantially horizontal direction at the bottom of the vehicle body, and a toe board 12 is connected to the front end of the floor panel 11 in a manner being raised upward. The toe board 12 is constructed such that a joint part 12a which is formed in a substantially horizontal direction and joined to the front end of the floor panel 11 from above, a tilted part 12b which is tilted at a predetermined angle, and a raised part 12c which is raised in a substantially vertical direction are curved in a continuous manner.

A dash pad 13 is disposed on the vehicle compartment side of the tilted part 12b of the toe board 12, and an ECU (Electronic Control Unit) 14 as a load transmitting member is disposed on the dash pad 13 via a mounting bracket 15. The dash pad 13 is comprised of a surface 13a and a noise insulating material 13b provided on the reverse side of the surface 13a. The ECU 14 has an electronic device, not shown, incorporated therein, and is shaped like a box and fixed inside the mounting bracket 15 which is bent double. The lower end of the surface 13a and a lower mounting part 15a of the mounting bracket 15 are fixed to the joint part 12a of the toe board 12.

On the other hand, a cross member 17 as a restricting member extending along the vehicle width is fixed to the rear of the floor panel 11. The floor panel 11 and the cross member 17 form a closed section. A seat bracket 31 which supports the lower end of a seat 30 is fixed to the upper surface of the cross member 17. To improve the easiness to step for a passenger, a carpet pad 18 shaped like a substantially flat plate is extended on the floor panel 11 rearward from a position in the vicinity of the lower end of the toe board 12 to the cross member 17. A curved part 18a and a tilted surface 18b are formed at the front end of the carpet pad 18, and are located to overlap the joint part 12a of the toe board 12. The rear end of the carpet pad 18 is abutted on the longitudinal wall of the cross member 17 to restrict the movement of the carpet pad 18 toward the rear of the vehicle body.

A fragile part 19 which is buckled by an impact load equal to or greater than a predetermined value applied from ahead is provided in the carpet pad 18 located in front of the cross member 17, and is located relatively close to the seat 30. The fragile part 19 is comprised of two first grooved parts 19a as first notched parts formed along the vehicle width by notching a rear part of the surface of the carpet pad 18 from above, and two second grooved parts 19b as second notched parts formed along the vehicle width by notching the lower surface of the carpet pad 18 from below at a location behind the first grooved parts 19a.

A carpet 20 is laid to cover the dash pad 13, ECU 14, mounting bracket 15, carpet pad 18, cross member 17, and so forth from above. An impact absorbing pad 21 as an impact absorbing member is attached to the reverse side of the front end of the carpet 20. The impact absorbing pad 21 is comprised of a first flat absorbing material 21a disposed in front, and a second flat absorbing member 21b disposed in opposed relation to and in contact with the first absorbing member 21a and at the rear of the first absorbing member 21a. The second absorbing member 21b is formed of a harder material than the second absorbing material 21b.

The impact absorbing pad 21 has a lower end thereof placed on the tilted surface 18b of the carpet pad 18, and has a lower surface thereof placed on an upper mounting part 15b of the mounting bracket 15. The carpet 20 has a front end thereof locked on the upper end of the mounting bracket 15. In this case, the impact absorbing pad 21 is disposed on the rear side of the toe board 12, and the ECU 14 and the mounting bracket 15 are disposed in opposed relation to the front end of the carpet pad 18.

Therefore, a horizontal and flat floor surface extending from the curved part 18a of the carpet pad 18 to a position in front of the cross member 17, and a flat stepping surface tilted from the curved part 18a to the impact absorbing pad 21 are formed on the carpet pad 18.

According to the above described floor structure of the vehicle according to the present embodiment, in the event of frontal crash, impact is applied to the toe board 12. The toe board 12 is about to deform by bending rearward from the joint part 12a joined to the floor panel 11. The initial impact load applied to the toe board 12 is transmitted to the impact absorbing pad 21 via the ECU 14 and the mounting bracket 15, and is absorbed by the impact absorbing pad 21. The load which is applied continuously from the initial load is transmitted to the carpet pad 18 via the ECU 14 (mounting bracket 15) and the impact absorbing pad 21.

Figure 2:
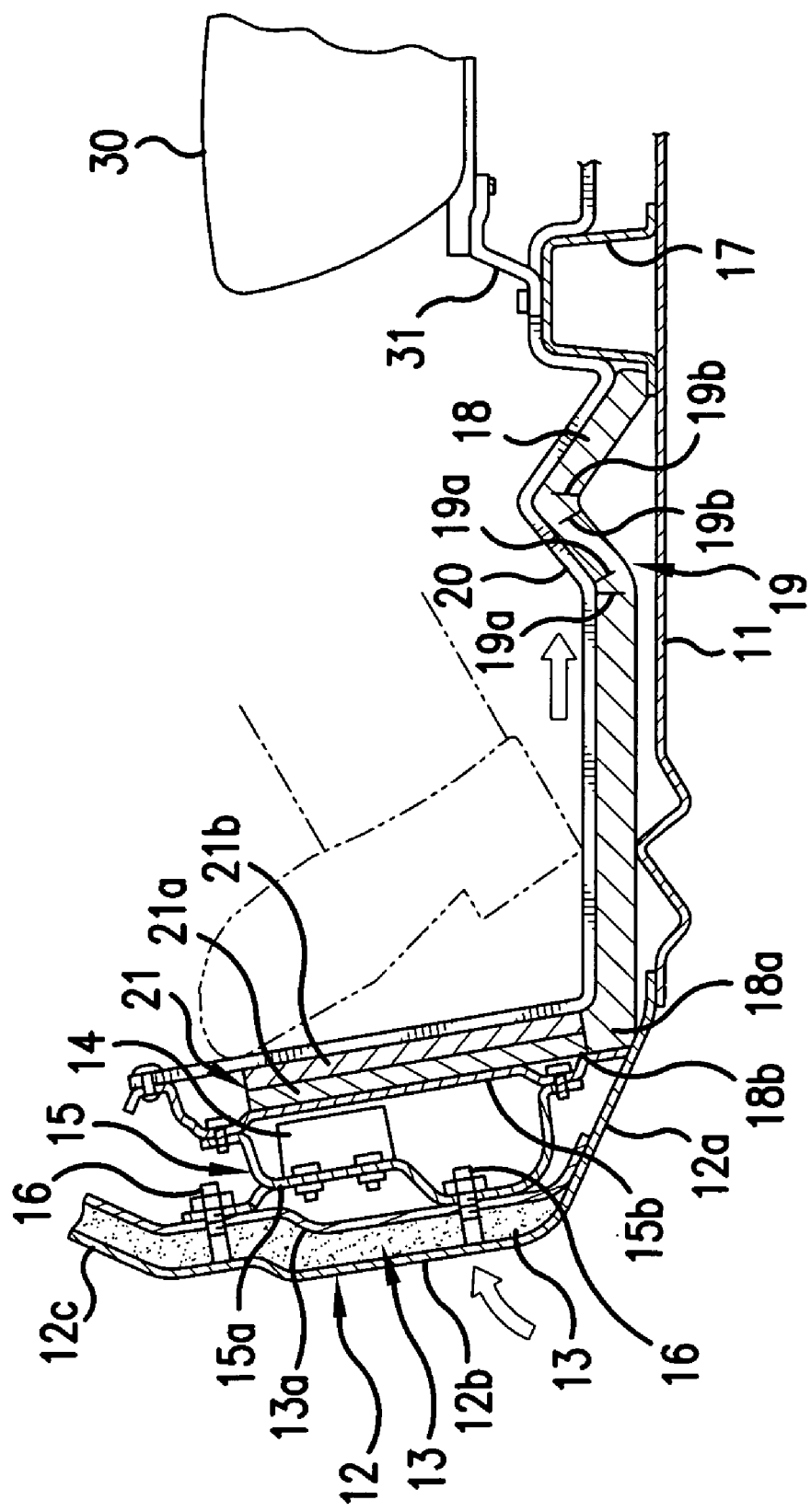
FIG. 2 is a view useful in explaining the operation of the floor structure of the vehicle according to the first embodiment in the event of frontal crash.

As shown in FIG. 2, when the load is applied to the front end of the carpet pad 18, the carpet pad 18 is buckled at the fragile part 19 thereof since the rear end of the carpet pad 18 is abutted on the cross member 17 to restrict the rearward movement of the carpet pad 18. Specifically, since the impact load collapses the grooved parts 19a and 19b of the carpet pad 18 in the direction of the length of the vehicle, the rear parts of the first grooved parts 19 are bent upward and the rear parts of the second grooved parts 19b are bent downward to cause the fragile part 19 to be buckled to an angular shape (turned downward).

Thus, the carpet pad 18 is buckled at a location close to the seat 30 and remote rearward from the passenger's legs, and this prevents the buckled carpet pad 18 from interfering with the passenger's legs. As a result, the passenger's ankles can slide rearward at a predetermined angle in the direction of the length of the vehicle without being bent rearward and locked. It should be noted that in the carpet pad 18, the fragile part 19 is located behind the toe board 12 by a predetermined distance such that the fragile part 19 never inhibits the rearward movement of the passenger's ankles (heels) in the direction of the length of the vehicle.

As described above, in the floor structure of the vehicle according to the present embodiment, the toe board 12 is connected to the front end of the floor panel 11 in a manner being raised upward, the ECU 14 is attached to the toe board 12 via the dash panel 13 by means of the mounting bracket 15, the cross member 17 is fixed to the rear of the floor panel 11, the carpet pad 18 is extended rearward on the floor panel 11 from the location in the vicinity of the lower end of the toe board 12, and the rear end of the carpet pad 18 is abutted on the cross member 17 to restrict the rearward movement of the carpet pad 18, and the fragile part 19 which is buckled by impact load is provided in the carpet pad 18, which is located in front of the cross member 17, and in the vicinity of the seat 30.

Therefore, in the event of frontal crash, when impact is input to the toe board 12, the load thereof is transmitted to the carpet pad 18 via the ECU 14 and the mounting bracket 15, and the carpet pad 18 is buckled at the fragile part 19 thereof, so that the buckled carpet pad 18 can be surely prevented from interfering with the passenger's legs. As a result, the passenger's legs move rearward, and the passenger's ankles can be prevented from being bent rearward and locked. Therefore, the safety for the passenger can be ensured in the event of crash with a relatively simple structure.

Further, since the fragile part 19 of the carpet pad 18 is comprised of the first grooved parts 19a formed by notching the carpet pad 18 from above and the second grooved parts 19b formed by notching the reverse side of the carpet pad 18 from below at a location behind the first grooved parts 19b in the direction of the length of the vehicle, the carpet pad 18 is buckled to an angular shape by bending at the grooved parts 19a and 19b thereof due to impact load, and hence the fragile part 19 can be properly buckled. Further, since the impact absorbing pad 21 is disposed on the rear side of the toe board 11 and is comprised of the first absorbing material 21a provided on the front side and the hard second absorbing material 21b disposed in opposed relation to and on the rear side of the first absorbing member 21a, the first absorbing material 21b which is hard can improve the easiness to step for the passenger, and the second absorbing material 21a which is soft can protect the passenger's ankles by surely absorbing the initial impact load.

Further, since the entire carpet pad 18 is extended from the location in the vicinity of the lower end of the toe board 12 to the cross member 17 to cover the upper surface of the floor panel 11, the upper surface of the carpet 20 can be substantially flat, and the passenger never has an uncomfortable feeling whichever part of the carpet pad 18 he/she steps on. Moreover, the passenger's leg never excessively sinks in the carpet pad 18, which prevents the quality of the vehicle compartment space from degrading.

Figure 3:
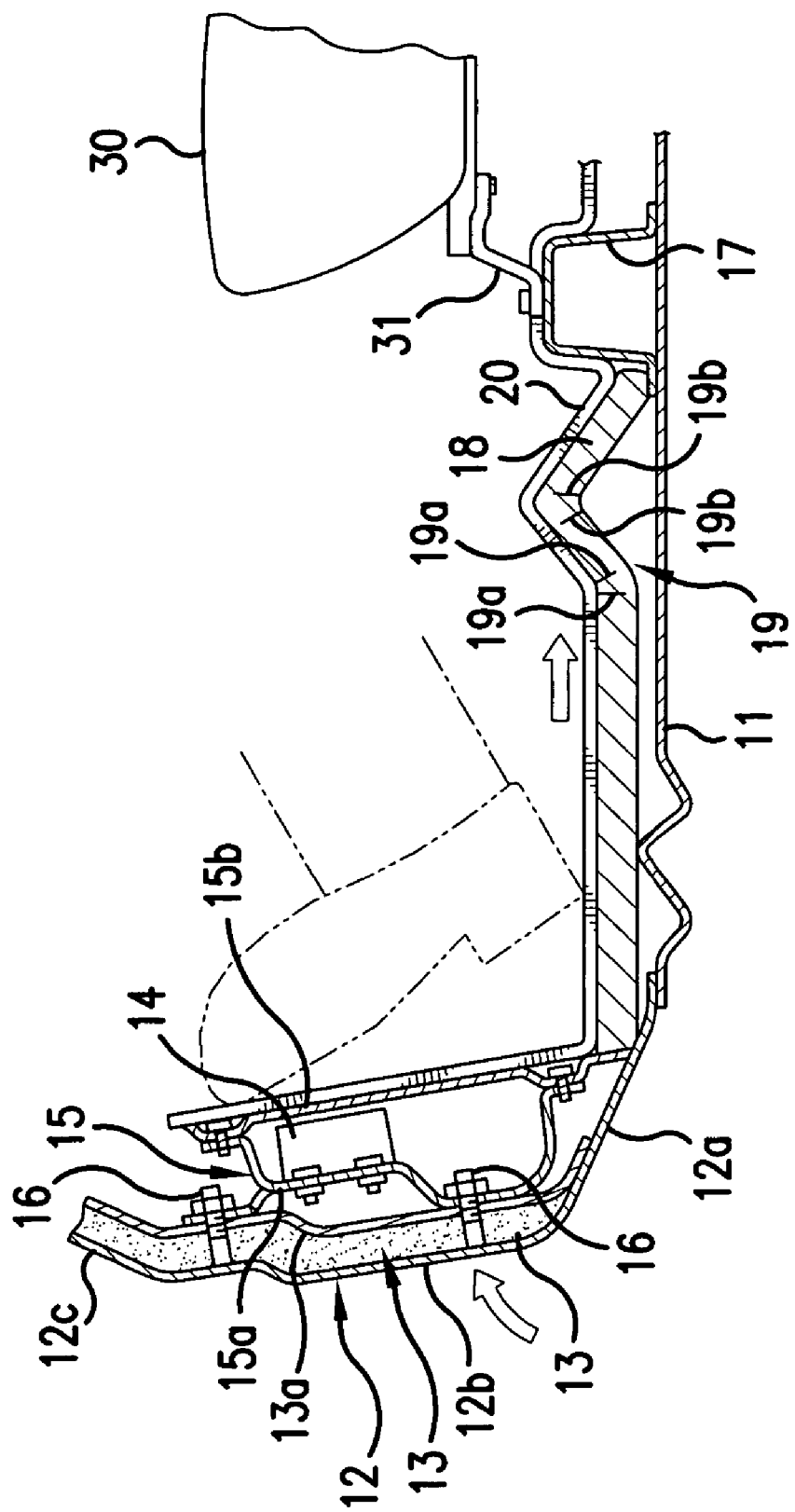
FIG. 3 is a sectional view showing essential parts of a vehicle body, which shows the floor structure of a vehicle according to a second embodiment of the present invention.
Figure 4:
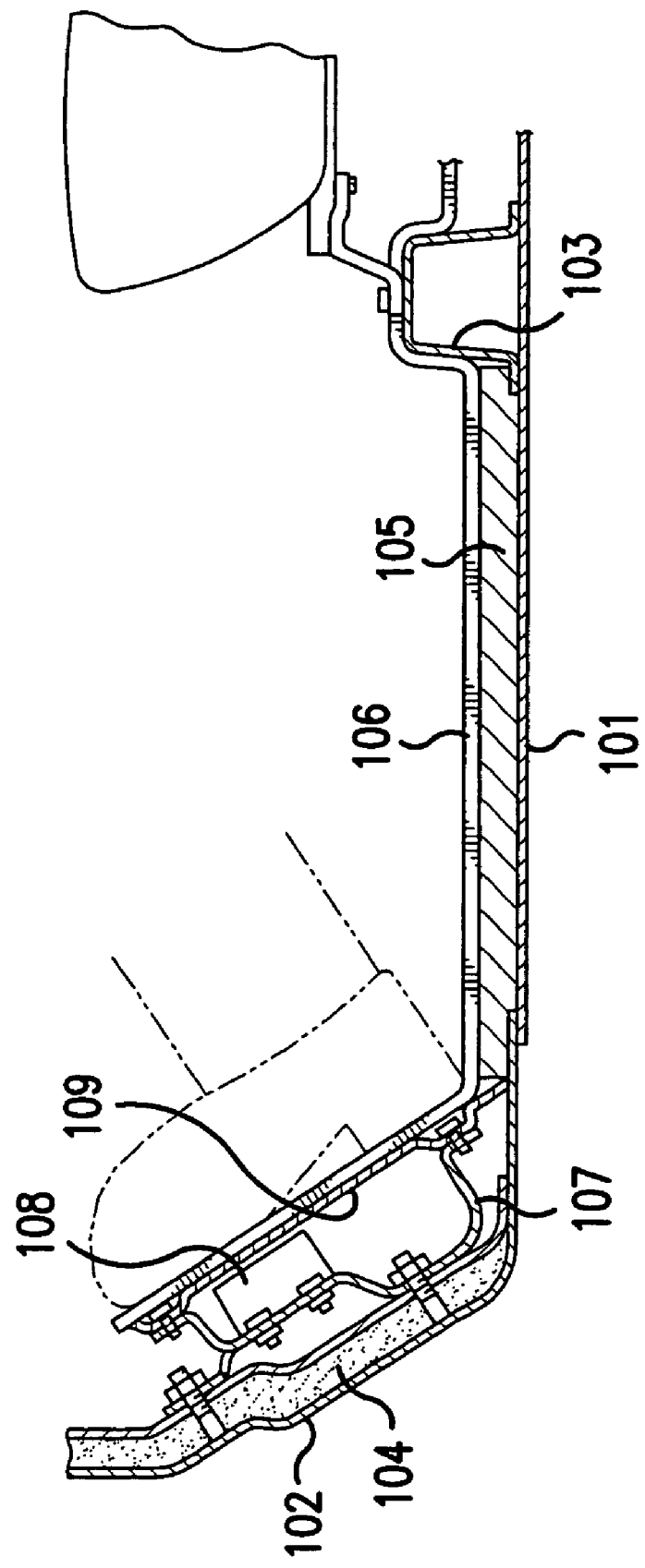
FIG. 4 is a sectional view of a vehicle body, which shows the conventional floor structure of a vehicle.
Figure 5:
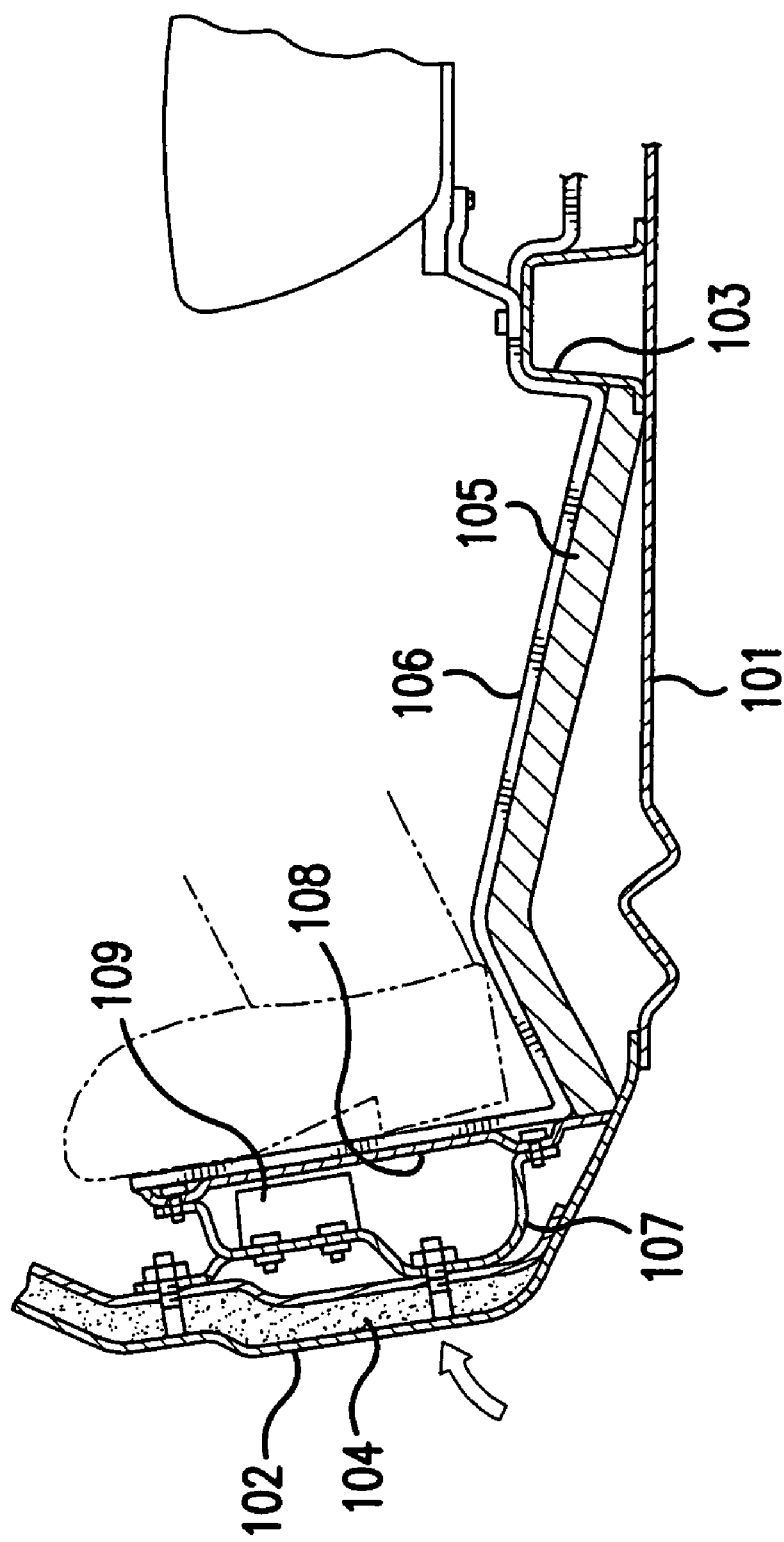
FIG. 5 is a sectional view of a vehicle body, which is useful in explaining the operation of the conventional floor structure of the vehicle.

FIG. 3 is a sectional view showing the essential parts of a vehicle body, which represents the floor structure of a vehicle according to a second embodiment of the present invention. As shown in FIG. 3, the floor structure of the vehicle according to the second embodiment is identical with the floor structure of the vehicle according to the above described first embodiment except that no impact absorbing pad is provided between the mounting bracket 15, which fixes the ECU 14 to the vehicle, and the carpet 20, and therefore, detailed description thereof is omitted. In the present embodiment as well, the carpet pad 18 is buckled at a location in the vicinity of the seat 30, which is remote rearward from the toe board 12 by a predetermined distance in the direction of the length of the vehicle, and hence the passenger's ankles can be prevented from being bent rearward and locked.

Although in the above described embodiments, the fragile part 19 of the carpet pad 18 is comprised of the grooved parts 19a and 19b formed by notching the upper and lower surfaces, the shape and number of the grooved parts 19a and 19b should not be limited, but a large number of concaved parts may be formed along the width of the vehicle, or concaved parts may be formed at three or more locations.

Further, although in the above described embodiments, the floor structure of the vehicle according to the present invention is applied to the passenger seat of the vehicle, the same effects can be obtained if the present invention is applied to a driver seat.

What is claimed is:

1. A floor structure of a vehicle, comprising:
   a toe board raised upward from the front end of a floor panel in the vehicle and having upper and lower ends;
   a pad member of substantially uniform thickness extended on the floor panel from a position in the vicinity of the lower end of said toe board toward the rear of the vehicle;
   a restricting member provided behind said pad member, for restricting movement of said pad member toward the rear of the vehicle;
   a seat disposed in the vicinity of said restricting member; and
   a fragile part provided in said pad member and in front of said restricting member in the vehicle, said fragile part being located only in the vicinity of said seat to allow movement of passenger's legs toward the rear of the vehicle when impact is applied to the vehicle from the front thereof.

2. A floor structure of a vehicle according to claim 1, wherein a load transmitting part is fixed to said toe board in opposed relation to a front end of said pad member.

3. A floor structure of a vehicle according to claim 2, wherein said load transmitting member comprises a mounting bracket for mounting an electronic control unit to the vehicle body.

4. A floor structure of a vehicle according to claim 1, wherein an impact absorbing member is disposed in opposed relation to a rear surface of said toe board.

5. A floor structure of a vehicle according to claim 4, wherein said impact absorbing member comprises a first absorbing material that is provided on a front side, and a second absorbing material disposed in opposed relation to said first absorbing member and on a rear side of said first absorbing member and is made of a harder material than said first absorbing member.

6. A floor structure of a vehicle according to claim 4, wherein said pad member is formed with a tilted surface at a front end thereof, and said impact absorbing member is placed on the tilted surface.

7. A floor structure of a vehicle according to claim 1, wherein said pad member is formed with a curved part at a front end thereof, the curved part being disposed to overlap a lower end of said toe board.

8. A floor structure of a vehicle according to claim 1, wherein said fragile part comprises first notched parts formed by notching said pad member from above, and second notched parts formed by notching said pad member from below and located behind said first notched parts.

9. A floor structure of a vehicle according to claim 1, wherein said restricting member comprises a cross member extending in a direction of a width of the vehicle.

10. A floor structure of a vehicle, comprising:
    a toe board supporting the legs of a passenger in the vehicle and raised upward from a front end of a floor panel in the vehicle and having upper and lower ends; and
    a pad member extended on the floor panel from a position in the vicinity of the lower end of said toe board toward the rear of the vehicle;
    wherein said pad member is weakened at only a location behind said toe board by a predetermined distance in such a manner as not to inhibit movement of the passenger's legs toward the rear of the vehicle by bending only at the location when impact is applied to the vehicle from the front thereof.

* * * * *